(12) United States Patent
Gatti et al.

(10) Patent No.: US 10,155,662 B2
(45) Date of Patent: Dec. 18, 2018

(54) PLANT FOR THE PRODUCTION OF MONOCHLORAMINE AND PROCESS THEREOF

(71) Applicant: ACEL S.R.L., Parma (IT)

(72) Inventors: Marco Gatti, Parma (IT); Daniele Alessandro Cauzzi, Parma (IT)

(73) Assignee: ACEL S.R.L., Parma (PR) (IT)

( * ) Notice: Subject to any disclaimer, the term of this patent is extended or adjusted under 35 U.S.C. 154(b) by 121 days.

(21) Appl. No.: 14/923,754

(22) Filed: Oct. 27, 2015

(65) Prior Publication Data

US 2016/0115028 A1 Apr. 28, 2016

(30) Foreign Application Priority Data

Oct. 28, 2014 (IT) .............. PR2014A0075

(51) Int. Cl.
*C01B 21/09* (2006.01)
*C02F 1/76* (2006.01)

(52) U.S. Cl.
CPC .............. *C01B 21/091* (2013.01); *C02F 1/76* (2013.01)

(58) Field of Classification Search
None
See application file for complete search history.

(56) References Cited

U.S. PATENT DOCUMENTS

| | | | |
|---|---|---|---|
| 2,438,204 A | 3/1948 | Castner | |
| 3,254,952 A | 6/1966 | Walter et al. | |
| 6,315,950 B1 | 11/2001 | Harp et al. | |
| 9,388,044 B2 * | 7/2016 | Gupta | C01B 21/091 |
| 2005/0211643 A1 | 9/2005 | Phillips et al. | |
| 2006/0124558 A1 | 6/2006 | Kouame | |
| 2007/0049642 A1 | 3/2007 | Singleton et al. | |
| 2009/0173697 A1 | 7/2009 | Axtell et al. | |

(Continued)

FOREIGN PATENT DOCUMENTS

| | | |
|---|---|---|
| EP | 2468684 A1 | 6/2012 |
| EP | 3015424 A | 5/2016 |

(Continued)

OTHER PUBLICATIONS

European Search Report (EPSR), dated Feb. 22, 2016, from corresponding European Patent Application No. EP15191748.

(Continued)

*Primary Examiner* — Wayne A Langel
(74) *Attorney, Agent, or Firm* — Young & Thompson

(57) ABSTRACT

A process for the production of monochloramine characterized in that it provides for drawing a portion of water intended for the user and exclusively using the portion for preparing the monochloramine solution. The portion intended for the reaction of formation of monochloramine is subjected to a treatment on osmotic membrane, obtaining osmotized water. Subsequently, there is the reaction of the water with reagents in a reactor. In the reaction step, inside the reactor, the osmotized water enters from a first orifice (C) via a solenoid valve with micrometric regulation (EV1). Inside the same reactor, the base chemical products enter via the respective orifices A and B. The base chemical products enter due to the action of metering pumps (e.g. peristaltic pumps). The system is managed by PLC.

7 Claims, 4 Drawing Sheets

(56) References Cited

U.S. PATENT DOCUMENTS

| | | |
|---|---|---|
| 2011/0278173 A1 | 11/2011 | Gunzinam et al. |
| 2012/0145630 A1 | 6/2012 | Ogiwara et al. |
| 2014/0105808 A1* | 4/2014 | McNeel ................ C01B 21/091 |
| | | 423/413 |
| 2015/0367315 A1 | 12/2015 | Barak |
| 2016/0115028 A1 | 4/2016 | Gatti et al. |
| 2016/0362318 A1 | 12/2016 | Simmons |

FOREIGN PATENT DOCUMENTS

| | | |
|---|---|---|
| JP | 2013022541 A | 2/2013 |
| WO | 2013051192 A1 | 4/2013 |

OTHER PUBLICATIONS

European Search Opinion, dated Feb. 2016, from corresponding European Patent Application No. EP15191748.
Italian Search Report (ITSR), dated Jul. 27, 2015, from corresponding Italian Patent Application No. IT2014PR00075.
International Search Report (ISR), dated Dec. 15, 2017, from International Application No. PCT/IB2017/055570.
Written Opinion of the International Searching Authority (WO-ISA), dated Dec. 15, 2017, from International Application No. PCT/IB2017/055570.
Italian Search Report (ITSR-2017), dated Jul. 27, 2017, from corresponding Italian Patent Application No. IT102016000092675.

\* cited by examiner

A: ACISAN-C ENTRANCE
B: ACISAN-AM ENTRANCE
C: H2O ENTRANCE
D: AIR HOLE
G: SOLUTION EXIT
M: CONTROL LEVEL SLOT
N: PH PROBE SLOT

PLANT FOR THE PRODUCTION OF MONOCHLORAMINE AND PROCESS THEREOF

FIELD OF THE INVENTION

The present finding is inserted in the field of systems and methods for the production of monochloramine.

More precisely, concentrated monochloramine with high purity.

According to the invention, monochloramine is obtained by means of controlled reaction process.

Monochloramine, produced in solution in a controlled reaction environment, will be injected into the fluid to be sanitized at the user.

The production in controlled environment, by using osmotized water for preparing the solution inside reactor, ensures a sanitizing product, not affected by the quality of the water that must be sanitized.

BACKGROUND OF THE INVENTION

There exist multiple systems on the market for the production of monochloramine as molecule and consequent use on water circuits, such as water intended for human consumption.

For years, also in Italy, monochloramine has been used in some Sardinian aqueducts.

A recent application that has appeared on the market provides for metering the monochloramine in sanitary circuits as a bactericidal agent.

Specifically, the production occurs by metering the base chemical products (hypochlorite solution+ammonium salts solution) directly over a portion of water drawn from the sanitary circuit itself intended for the user, brought into the machine and then the chemical reagent products are injected over the derived flow; the reaction therefore does not occur in a controlled environment but it is subjected to different variables. The monochloramine is therefore produced with reaction on the same flow of water drawn from the sanitary circuit, without any pretreatment, and is subsequently re-introduced.

Both the system and the claimed process provide for the formation and metering of the molecule of monochloramine in a completely different manner, deeming it suitable to separately produce a concentrated solution of pure monochloramine without any affect from the circuit within which the solution is subsequently intended to be metered.

In this manner, the monochloramine obtained by the present process and with the present system maintains the purity of production regardless of the quality of the water of the circuit intended for the user that must be sanitized, and even more so, the production of the molecule occurs in a controlled environment.

SUMMARY OF THE INVENTION

Object of the present finding is to produce concentrated monochloramine with high purity by means of a controlled reaction process.

In order to obtain this, the system and the machine provide for:

controlling the pressure of the service water used for the reaction solution, filtrating over osmotic membranes, obtaining osmotized water of only the portion intended for the reaction, metering the chemical reagents by means of volumetric metering pumps, such as peristaltic pumps, controlled introduction of the reagents into a suitable reactor with said water as reaction solvent, controlling the pH of the reaction environment, metering of the concentration solution thus obtained with metering pumps in the fluid to be sanitized, analyzing the sanitized fluid with detection of characteristic parameters which allow automating the metering of the concentrated solution.

The object of the insertion of an osmotized water production plant, with osmosis membranes only for the reaction water, is to obtain—at the entrance of the reactor (for the subsequent reaction of the reagents A and B indicated hereinbelow)—a dilution solution lacking salts, lacking organic micromolecular substances, extremely similar chemical-physical-organoleptic characteristics regardless of the location where the water serving the plant is drawn.

Regardless of the supply source of the structure in which the machine is installed, the reaction is always ensured and the produced monochloramine will have the same characteristics, preventing the formation of by-products.

Said objects and advantages are all attained by the plant for the production of monochloramine and process thereof, object of the present finding, which is characterized for that provided in the below-reported claims.

BRIEF DESCRIPTION OF THE DRAWINGS

The abovementioned characteristics and others will be more evident from the following description supported by the enclosed drawing tables (FIG. 1.

FIGS. 1, 2 and 3: illustrate the functioning scheme of the plant and of the present process, FIG. 4: illustrates the particular shape of the reaction reactor and placement of the inlets of the reagents and of the osmotized water as well as the housings of the PH probe and of the level control.

DETAILED DESCRIPTION OF THE INVENTION

Figure 1:
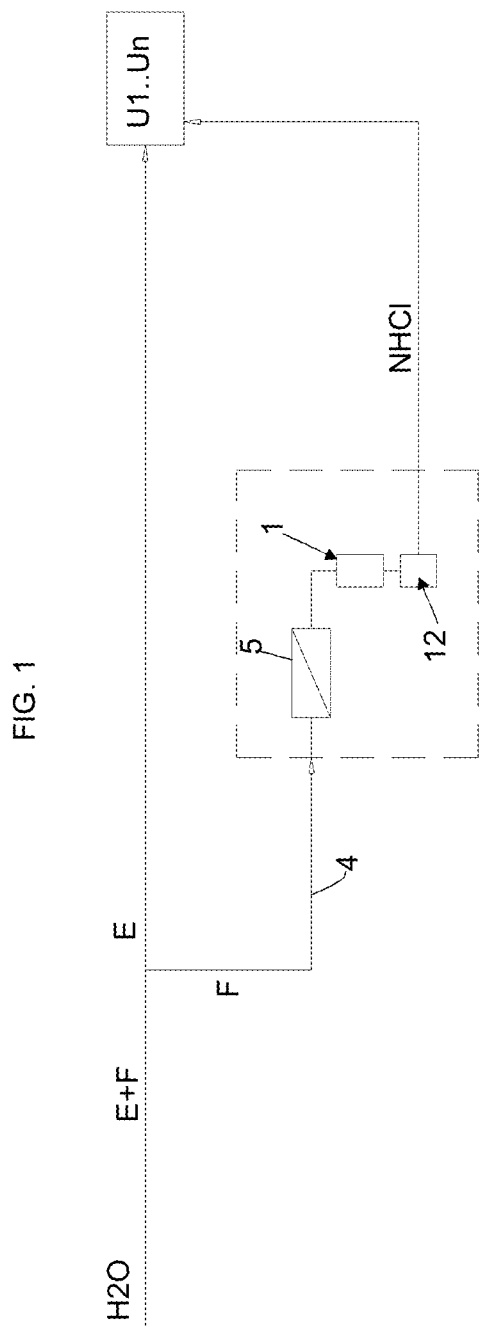

It is known that in order to obtain monochloramine, a reaction of ammonia and hypochlorite must occur according to the following formula:

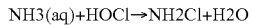

$$NH_3(aq) + HOCl \rightarrow NH_2Cl + H_2O$$

Therefore there are two entering reagents, reagent A and reagent B, which following their reaction produce monochloramine and water.

Said reagents are defined as follows:

with the term REAGENT A, sodium hypochlorite is indicated; in the present invention, the hypochlorite is stabilized at a specific concentration; hereinbelow the REAGENT A will be indicated with the term ACISAN-C.

With the term REAGENT B, ammonium in salt form is indicated, in solution with other substances in order to reach a consistent value of pH and a defined ammonia concentration; hereinbelow, we define the REAGENT B with the term ACISAN-AM.

Ratio Between the Reagents

With regard to the ratio between the reagents, the used formula is the following:

The base reaction for the production of monochloramine:

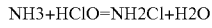

$$NH_3 + HClO = NH_2Cl + H_2O$$

wherein:
NH2Cl is monochloramine
NH3 is ammonia
HClO is hypochlorous acid obtained via hydrolysis of the sodium hypochlorite by the following reaction:

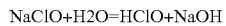

In the case of the present invention, the reagent B, i.e. ACISAN AM, contains NH4Cl+NaOH+NH3, hence the overall reaction, in addition to the above base formulation, is also composed of the following reaction:

DESCRIPTION OF THE FINDING

In order to obtain the production of monochloramine, the machine and the process provide for:
drawing a minimal part of the water, intended for the user, used for the reaction solution;
controlling the pressure of the service water used for the reaction solution;
filtering, over osmotic membranes, the water used for the reaction solution, obtaining osmotized water. For such purpose, an osmotized water production plant is inserted with osmosis membranes, since it is necessary to insert in reaction a dilution solution lacking: salts, organic micromolecular substances retained with the osmotic process. All this in order to obtain extremely similar chemical-physical-organoleptic characteristics regardless of the supply source of the portion of water used for the reaction solution;
the reaction taking place in a suitable reactor, reference FIG. 2; FIG. 3, as described below, for obtaining pure monochloramine solution;
metering chemical products (ACISAN AM and ACISAN C), contained in suitable tanks 6 and 7, into the right proportions for creating a solution with concentration variable between 1 mg/l and 500 mg/l of monochloramine which is equivalent to 0.73 mg/l and 365 mg/l of Cl2.

When the monochloramine molecule has been produced, it has a stability that allows being injected into the circuit to be subjected to sanitization, intended for human consumption regardless of whether it is hot or cold water.

Figure 4:
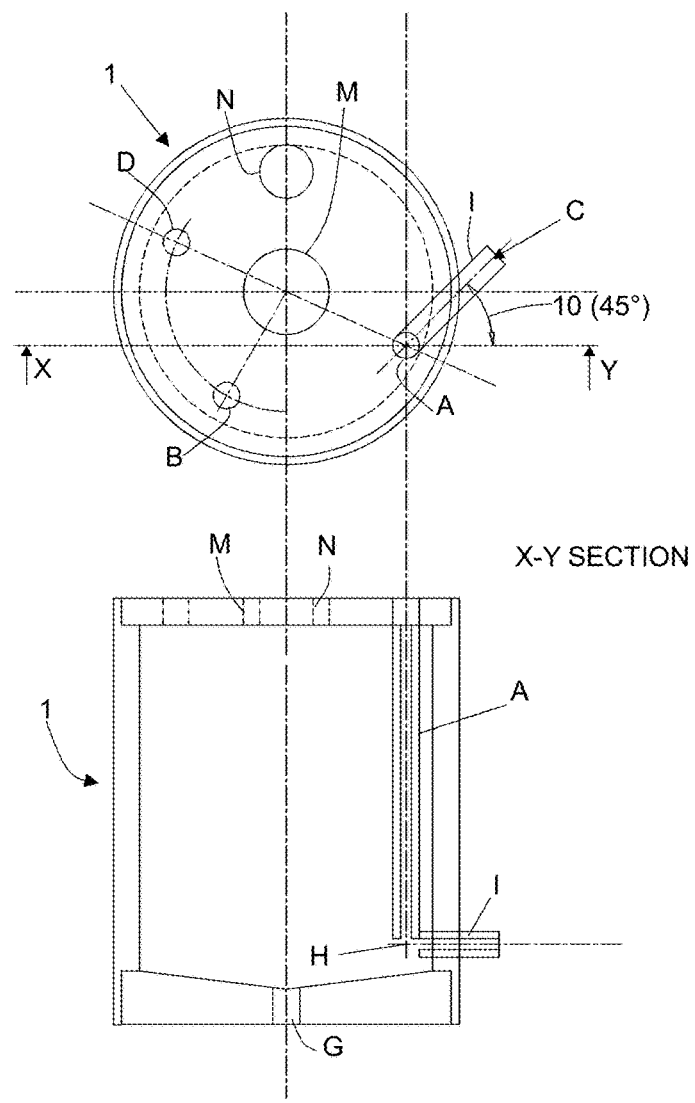
FIG. 4), which serve as a merely non-limiting example.

The production plant, in a schematic manner, occurs in the following way; the following components are inside the machine:

1) entrance reducer 2 (water entrance line 4) with pressure regulation of the entrance line intended for the reaction solution, manostat 3, with which said pressure values are controlled at: 2-5 bar;

2) an osmotic plant 5; with pump positioned inside the osmosis plant, which takes the water at the pressure reduced by the pressure reducer 2 (see above) and pressurizes it in order to overcome the osmotic pressure (pressure required for making the water pass through the osmotic membranes), giving the residue necessary for feeding the reaction solution;

3) reaction reactor 1 in the detail of FIG. 4; the osmotized water enters into a first orifice, indicated with C, by means of micrometric regulation of the charging solenoid valve, indicated with EV1;

4) the reactor 1 also provides for two further entrances, indicated with A and B, of the components, already previously described, adapted to take part in the reaction.

The process provides for the following steps of production of monochloramine:

A. the component ACISAN-AM (reagent B) is inserted into the reactor 1, through an orifice B, simultaneous with the entrance of the osmotized water. The feeding of the reagent B occurs by means of a metering pump 8 (e.g. peristaltic) controlled by PLC (programmable logic controller) until a settable predefined level is reached.

B. after the defined time has elapsed or once the preset level is reached, osmotized water continues to flow to the reactor and the reagent A, i.e. ACISAN-C enters through a third orifice indicated with A; the reagent A is introduced by means of pump 9 (e.g. peristaltic) controlled by PLC until a settable predefined level is reached.

C. after the defined time has elapsed or once the preset level is reached, the previously osmotized water continues to flow, through C, to the reactor 1, until the final level is reached, defined by a sensor housed in the space M illustrated in FIG. 4.

The function of the osmotized water, in addition to acting as dilution, due to the internal shape of the reactor allows the indispensable mixing of the base chemical products A and B already described above (ACISAN-C, ACISAN-AM).

In order to avoid the formation of by-products, the monochloramine formation process according to the invention provides that the reaction occurs at regulated pH level, falling within a range defined between PH 8-12. For such purpose, inside the reactor, a probe 11 or pH probe is positioned, housed in the space N of FIG. 4, which verifies that the pH of the solution falls within a range between PH 8-12.

This measurement occurs upon reaching step C. If the read value, at the end of the step C, is outside the range pH 8-12, the system will generate an alarm from the PLC which will block the production and eliminate all that produced outside the aforesaid range.

On the contrary, if the reaction occurred regularly, in compliance with the controls executed by the PLC, and the pH falls within the predefined 8-12 range, then the production of pure monochloramine solution took place and hence the solution descends from the reactor, by means of the solenoid valve EV2, into the storage tank 12, being available for use.

The monochloramine solution that is produced in the reactor 1, obtained via mixing of osmotized water, ACISAN-AM solution, i.e. product B, and ACISAN-C, i.e. product A, (in sequence, first ACISAM AM is metered and then ACISAN C) has a concentration of monochloramine variable between 1 mg/l and 500 mg/l of monochloramine which is equivalent to 0.73 mg/l and 365 mg/l of Cl2.

Once the monochloramine is stored in the storage tank 12, whose level is controlled by a sensor 13, it is metered to the users U1 . . . Un to be sanitized by means of metering pumps 14 which operate according to PID and/or proportional—volumetric logic.

With metering logic of proportional—volumetric type, the metering of the monochloramine occurs by means of metering pump, which injects as a function of the signal coming from a flow rate detector C1 . . . Cn. The signal is proportional to the amount of water that passes by the flow rate detector.

With metering logic of PID type, the metering occurs by means of metering pump which receives a signal from a control unit outside or inside the pump itself. Multiple values reach the control unit, such as: a signal proportional to the concentration of the monochloramine measured on the user U1 . . . Un by means of an analysis system 15 plus a time, insertable by a technician, as a function of a circuit inertia which calculates the time necessary for the metered solution to be diffused in the circuit itself and reach the analysis system. Simultaneously, also the reading of the flow rate detector is inserted.

Substantially, the PID metering depends on three parameters: analysis of the concentration of the sanitizing agent, inertia time of the circuit, flow rate of water to the users. This allows having a regular metering, preventing hyper-concentrations at some points of the circuit. The system also provides for other analyses 15 which can be inserted by the management PLC in regulating the metering of monochloramine in the user U1 . . . Un to be sanitized, such as: Redox potential, pH, free chlorine, total chlorine, free NH3.

DESCRIPTION OF THE REACTOR

Figure 2:
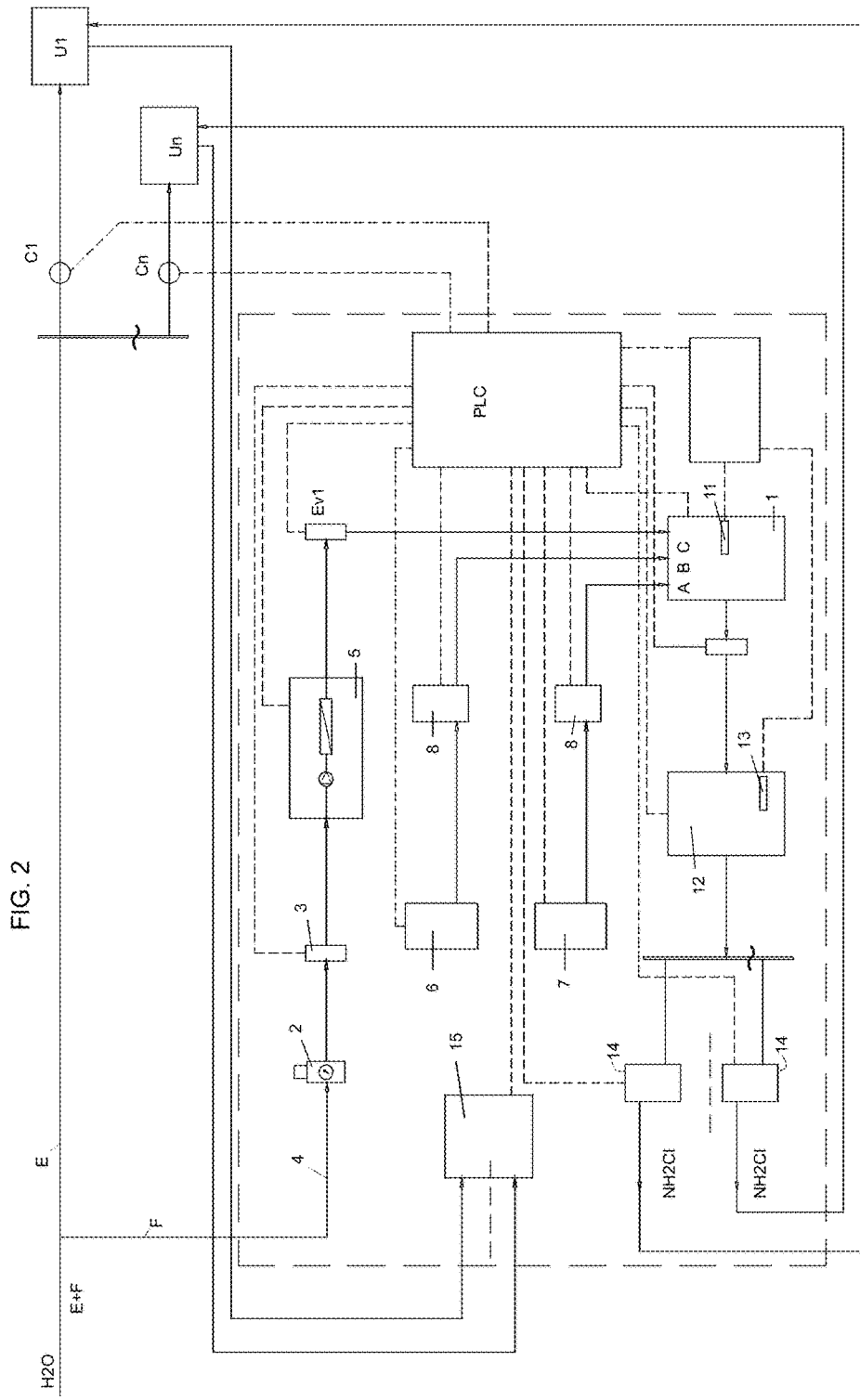
FIG. 2.
Figure 3:
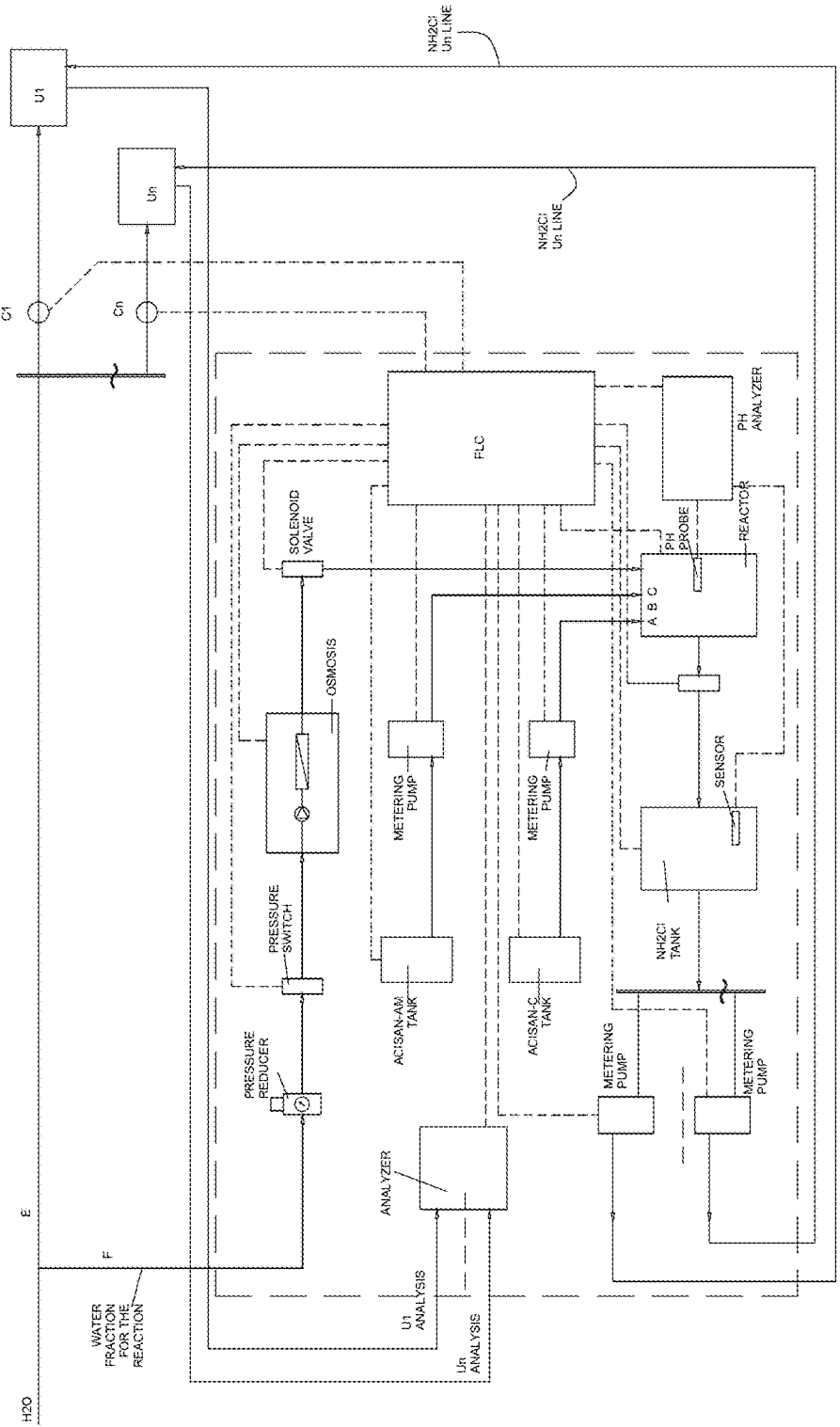
FIG. 3.

The reactor, indicated overall with 1 in FIGS. 1,2,3 and in particular in FIG. 4, is a cylindrical container closed at the base ends.

The lower base reports an outlet mouth for the connection with a storage tank 12 for the produced monochloramine.

The upper base has at least two openings, indicated with A and B in FIG. 4, through which the REACTION A (ACISAN C) and REACTION B (ACISAN-AM) solutions respectively enter. The entrance of the osmotized dilution water is indicated with entrance C.

The entrance C is situated in the lateral cylindrical jacket of the reactor.

The entrance C is not perpendicular to the jacket, i.e. it is not in radial direction.

The entrance C forms an angle of 45°, see reference 10 in FIG. 4, with respect to the tangent of the insertion point with the point H where there is the release of the osmotized water in the reactor, water transported through duct I.

Point H is situated inside the reactor, in the lower zone adjacent to the jacket, but far from the latter.

The product A, as the section of the reactor of FIG. 4 illustrates, is introduced into the reactor, it too in proximity to the point H, but according to an axial direction with respect to the reactor itself; in order to do this, the presence of the duct L is observed, which arrives from the upper base and is extended inside the reactor up to point H.

Therefore, while the entrance of the product A and B is in the same axial direction, of the reactor 1, the entrance of the osmotized water, from the osmotic plant 5, is on a plane parallel to the base of the reactor 1.

Said geometry of the reactor 1 and arrangement of the entrances A, B, C of the products facilitates the reaction thereof and contributes to the mixing of the solutions and the formation of monochloramine according to that provided by the invention.

The product B, as the plan of the reactor of FIG. 4 illustrates, is introduced into the reactor in the orifice B on the top of the reactor itself.

The osmotized water used for the reaction solution of monochloramine is a part of the water intended for the final user; said osmotized water used for the reaction solution of monochloramine is re-introduced into the circuit at the end of the reaction. FIG. 1 indicates an example thereof.

The flow rate of water intended for the user being indicated with E+F, the process requires that a minimal part, F, is filtered by means of osmotic membranes and subsequently introduced into the reaction reactor together with the reagents A and B; then, an equivalent quantity of monochloramine produced by the reactor itself returns into the circuit.

The invention claimed is:

1. A process for the production of monochloramine, comprising:
   drawing a portion of water for a user and exclusively using said portion for preparing a monochloramine solution;
   subjecting the portion for preparing the monochloramine solution to a treatment on an osmotized membrane and obtaining osmotized water,
   making said osmotized water react with reagents in a reactor, said reactor comprising a base and extending in an axial direction from said base, wherein the reagents are introduced in said axial direction of the reactor while the osmotized water is introduced on a plane parallel to the base of the reactor, in non-radial direction, and wherein said osmotized water is made to react with the reagents, simultaneously with the introduction of the osmotized water into the reactor:
   introducing a reagent B, comprising an ammonium solution in salt form, through an orifice;
   introducing a reagent A, comprising stabilized sodium hypochlorite, through another orifice, after introduction of the reagent B;
   the osmotized water being continuously introduced into the reactor during introduction of each reagent,
   measuring pH of pure monochloramine solution produced by the reaction and verifying that said value falls within a range between 8-12;
   discharging the solution produced in the reactor towards a storage tank after verifying that the pH is within the range of 8-12, rendering the monochloramine produced by the reaction available for use.

2. The process according to claim 1, wherein the introduction of the reagents into the reactor occurs in proximity to a point inside the reactor where the introduction of the osmotized water into the reactor also occurs.

3. The process according to claim 1, wherein the portion of water that is drawn, osmotized and used for the reaction for preparing monochloramine is a portion of service water from a water circuit of the user; said osmotized service water used for the reaction and containing monochloramine is re-introduced into the water circuit of the user at the end of the reaction, in a quantity equivalent to the portion of service water drawn for the process for preparing the monochloramine solution.

4. The process according to claim 1, wherein the monochloramine solution which is produced in the reactor has a concentration of monochloramine variable between 1 mg/l and 500 mg/l of monochloramine which is equivalent to 0.73 mg/l and 365 mg/l of $Cl_2$.

5. The process according to claim 1, wherein the reagent B contains $NH_4Cl+NaOH+NH_3$.

6. The process according to claim 1, wherein the introducing of the reagents into the reactor is performed by peristaltic pump controlled by a programmable logic controller.

7. The process according to claim 1, further comprises controlling pressure of the portion of water used for the reaction solution.

* * * * *